United States Patent Office 3,406,702
Patented Oct. 22, 1968

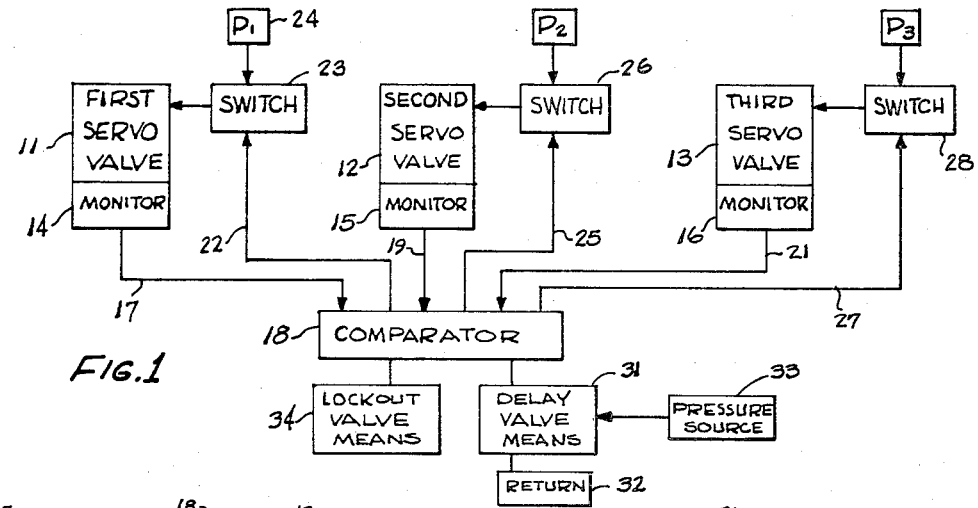
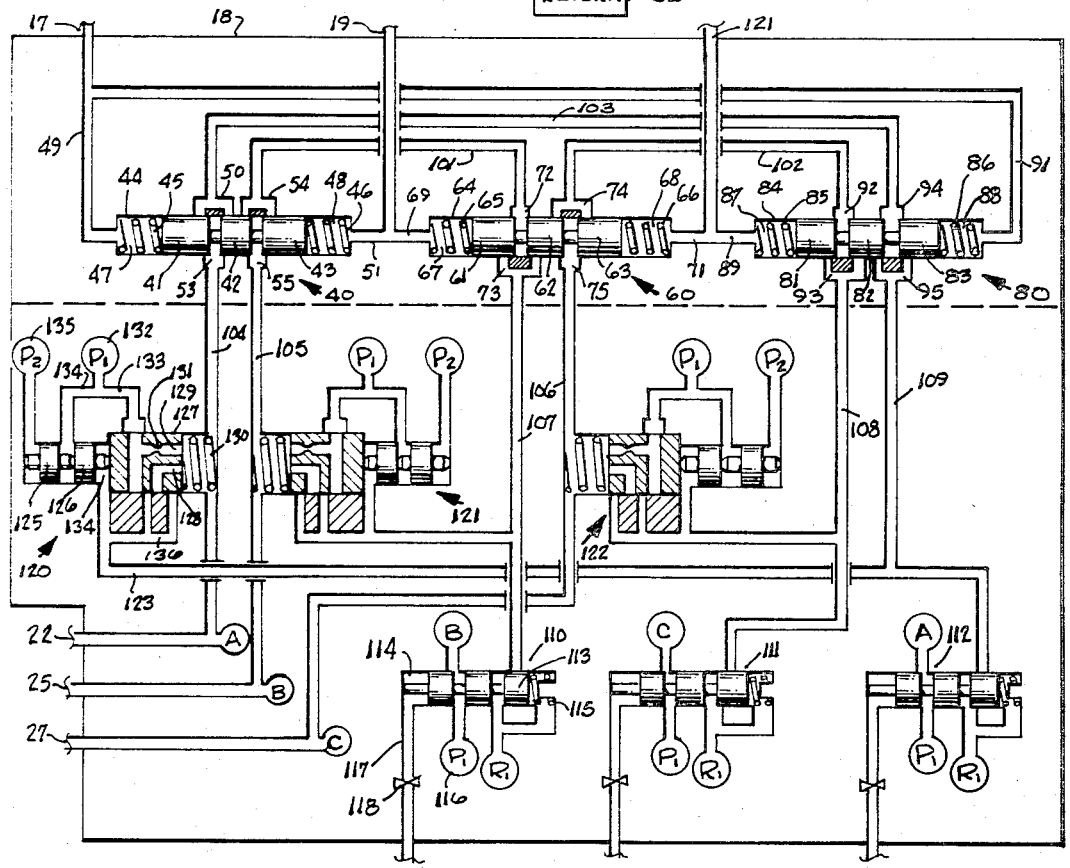

3,406,702
APPARATUS FOR COMPARING HYDRAERIC PRESSURE SIGNALS AND DETECTING DISPARITY THEREBETWEEN
Gavin D. Jenney, Sepulveda, Calif., assignor to Bell Aerospace Corporation, a corporation of Delaware
Filed Dec. 1, 1965, Ser. No. 510,866
13 Claims. (Cl. 137—87)

ABSTRACT OF THE DISCLOSURE

Disclosed is apparatus where at least three hydraeric signals representative of a condition of a part of the system are compared to ascertain discrepancies therebetween. Such signals traditionally are the type developed in a redundant hydraeric control system having two control channels and a monitor channel, each of the signals being taken from a similar point in each channel. The signals are applied across spool valves which translate in response to force differential sensed thereby to thus open communication between ports normally closed by the spool valve lands. A different signal is applied to each end of each spool valve to detect not only a discrepancy occurring but in which channel of the system the discrepancy occurred. The ports are interconnected between the spool valves and to system return in such a manner that upon translation of at least two of the spool valves system return is connected to a switch means to disable the channel in which a failure has occurred. Appropriate delay valves are incorporated into the system to prevent the spool valves from translating upon initial application of system pressure until the system has stabilized. Appropriate lockout valves are employed to prevent reactivation of a previously failed channel once a failure therein has been detected.

---

This invention relates generally to hydraeric systems and, more particularly, to apparatus for use in such systems which is adapted to compare hydraeric pressure signals and detect disparity therebetween. More specifically, such apparatus develops an output signal in response to disparity in input signals, such output signals being utilized to deactivate that portion of the system from operation which resulted in the improper signal being created.

It is very often desirable to operate a control system which, upon the failure of any portion thereof, will automatically cause transfer to another duplicate portion of the system, thus enabling the overall control system to continue to operate in spite of a failed component. Such a system is generally referred to as a fail-operate system. To accomplish detection of a failed unit and switching to an operable component requires at least three input signals which must be compared. After comparison of these signals to determine that they are properly oriented according to some predetermined basis, the output signal generated by the comparison structure must then in turn be compared to determine precisely wherein the failed component is located. After such comparison has been accomplished, an output signal is produced which must then be utilized to effect a transfer from the failed portion of the system to an operable portion of the system.

Prior art apparatus for accomplishing such comparison, detection and transfer or switching has for the most part included relatively complex electronic or electrical equipment and in those cases where hydraeric systems have been involved, relatively complex mechanism has been involved.

By utilization of electronic equipment, it is normally required that the same be maintained in a predetermined ambient condition, at least insofar as cleanliness and temperature are concerned. Furthermore, reliability of much electronic equipment, particularly under rugged operating conditions, can be somewhat questionable. Furthermore, the more complex a hydraulic system becomes, the more likelihood there is of failure; i.e., the reliability thereof becomes less. In addition thereto, most electronic systems and complicated hydraeric systems are relatively expensive to manufacture and maintain.

Accordingly, it is an object of the present invention to provide an apparatus for comparing hydraeric pressure signals and detecting disparity therebetween which is simple of construction, easy to maintain, and is more reliable than prior art systems.

It is another object of the present invention to provide an apparatus for comparing hydraeric pressure signals and detecting disparity therebetween which is rugged and operates reliably even under adverse operating conditions.

It is a further object of the present invention to provide an apparatus for comparing hydraeric pressure signals and detecting disparity therebetween which upon the occurrence of a disparity locks the apparatus in position to preclude accidental reactivation thereof.

Other objects and advantages of the present invention both as to its organization and method of operation will become apparent from a consideration of the following description taken in conjunction with the accompanying drawing which is presented by way of example only and is not intended as a limitation upon the scope of the present invention and in which:

FIGURE 1 is a schematic diagram in block form of a hydraeric control system utilizing apparatus for comparing hydraeric pressures and detecting disparity therebetween in accordance with the present invention; and FIGURE 2 is a schematic diagram of apparatus for comparing hydraeric pressures and detecting disparity therebetween in accordance with the present invention.

Apparatus for comparing hydraeric pressures and detecting disparity therebetween in accordance with the present invention includes three spool valves which are slidably disposed in respective bores therefor. Hydraeric pressure signals are applied to opposite ends of the spool valves and the valves are adapted such that they translate within the bores in response to a difference in pressure applied thereto. Ports are defined by the bores within which the spool valves translate and passageway means communicate between the ports in such a manner that predetermined ones of the ports are interconnected in response to translation of at least two of the spool valves.

Referring now to the drawing and more particularly to FIGURE 1 thereof, a system is illustrated in block form which is adapted for utilization by an apparatus for comparing hydraeric pressures and detecting disparity therebetween in accordance with the present invention. As is illustrated in FIGURE 1 there is provided first, second and third servo valve mechanisms 11, 12 and 13 respectively. Affixed to each of the servo valves is a monitor apparatus designated 14, 15 and 16 respectively. An output signal developed by the monitor 14 is applied by way of lead or conduit 17 to a comparator 18. An output signal developed by the monitor 15 is applied by way of lead 19 to the comparator 18 while an output signal developed by the monitor 16 is applied by way of lead 21 to the comparator 18. The input signals developed by monitors 14, 15 and 16 are continuously compared to ascertain uniformness thereof and in response to any disparity in the input signals, an output signal is generated; i.e., if the input signal developed by the monitor 14 disagrees with the input signals developed by the monitors 15 and 16, then a proper output signal is generated by the comparator 18 and is applied back to effect a deactivation of the failed portion of the system. For example, such an output signal is applied by way of lead 22 to a switch 23. Operation of the switch 23 deactivates the servo valve 11 by removing a source of pressure $P_1$ as shown at 24 therefrom. Similarly, in the event that the input signal developed by the monitor 15 is in disparity, then the comparator 18 develops an output signal which is applied by way of lead 25 to a switch 26 which removes source of pressure $P_2$ from the second servo valve 12. A similar operation occurs applying an output signal by way of lead 27 to the switch 28 for purposes of removing the source of pressure $P_3$ from the third servo valve 13 in the event that the input signal from monitor 16 is in disparity.

It has been found in some applications that it is desirous to preclude operation of the comparator until a certain predetermined time after the application of hydraeric pressure thereto. Under these circumstances a delay valve means such as is shown at 31 may be employed. The delay valve means may connect system return as shown at 32 to the comparator. However, the delay valve means maintains the return shutoff from the comparator until applications of pressure from a source 33 thereof is made and then for a predetermined period thereafter.

Under most applications for systems of the type above referred to, it is desirous after detection of a disparity and the deactivating of the failed component to assure that it will not return into operation even momentarily. In order to accomplish this, a lockout valve means 34 may be utilized in conjunction with the comparator 18.

Various details of the comparator, delay valve means, and lockout valve means, are illustrated more in detail in FIGURE 2 to which reference is hereby made.

As is shown in FIGURE 2, the comparator 18 includes three comparison portions indicated at 40, 60 and 80. The comparison section 40 includes a spool valve having three lands 41, 42 and 43. The spool valve is slidably disposed within a bore 44 and is positioned therein by springs 45 and 46 at each end thereof. As is illustrated in FIGURE 2, the spool valve has equal opposite end areas. It should, however, be expressly understood that such is not required. The end areas may be any area desired so long as a predetermined arrangement is effected with respect to the input signals which are applied to the spool valve to effect a force differential there-across in the event of a failure; i.e., by properly sizing the end areas of the valve, the spring rates of the springs 45 and 46 and the hydraeric pressures applied to the end areas of the spool valve any desired predetermined relationship between the input signals may be arranged. The bore 44 and the end areas of the spool valves define chambers 47 and 48, to which input pressure signals are applied. For example, conduit 17 interconnects with passageway 49 which is connected to the chamber 47 while the conduit 19 connects to the passageway 51 which is in turn connected to the chamber 48. Thus it is seen that the input pressure signals developed by the monitors 14 and 15 (FIGURE 1) are applied to opposite sides of the spool valve in comparison section 40. The operation of the spool valves and the end results of such operation will be described more in detail hereinafter.

As is also illustrated in FIGURE 2, the bore defines port means. For example, ports 52 and 53 are defined by the bore 44 and also ports 54 and 55. It should be noted that when the spool valve is centered and in the position illustrated in FIGURE 2, communication between ports 52 and 53 is blocked by the lands 41 and 42 of the spool valve while the lands 42 and 43 of the spool valve block communication between the ports 54 and 55.

The comparison sections 60 and 80 of the comparator are identical in structure to the comparison section 40. Such identity in structure is indicated by utilizing a similar series of reference numerals for each of the various parts, beginning with the numeral 61 and the numeral 81 (as opposed to the numeral 41), for the comparison sections 60 and 80 respectively. Therefore, further detailed description of the comparison sections 60 and 80 will not be given at this point.

It should, however, be recognized that the spool valve at comparison section 60 has the input signals from monitor 15 and monitor 16 applied there-across to the chambers 67 and 68 respectively while the spool valve at comparison section 80 has applied there-across the monitor input signals from the monitor 16 and the monitor 14 by having the input pressures applied to chambers 87 and 88 respectively.

It should further be noted that conduit means 101 is interconnecting port 54 of the comparison section 40 with port 72 of the comparison section 60. Conduit 102 is connecting a port 74 of comparison section 60 with the port 92 of comparison section 80 while the conduit 103 interconnects the port 52 of comparison section 40 with the port 94 at comparison section 80. An output signal conduit means 104 is connected to the port 53 while an output signal conduit means 105 is connected to the port 55 both in the comparison section 40 while an output signal conduit 106 is connected to the port 75 of comparison section 60. The remaining three ports, viz., 73 in comparison section 60 and 93 and 95 in comparison section 80 are each connected to system return $R_1$. It should, however, be noted that in each instance a delay valve means is interconnected in a conduit 107, 108 and 109, as is illustrated at 110, 111 and 112 respectively. Each of the three delay valve means 110, 111 and 112 are identical and therefore only the delay valve 110 will be described in detail.

The delay valve 110 includes a spool valve 113 disposed within a bore 114 in such a manner as to be slidable therein. Spring means 115 maintains the spool valve 113 in the position illustrated in the absence of an activation pressure being applied thereto. As is illustrated, the spool valve 113 blocks communication of the conduit 107 with system return $R_1$ so long as it remains in the position shown in FIGURE 2. While in the position shown in FIGURE 2, it should be noted that system pressure $P_1$ as illustrated at 116 is applied to the output pressure conduit 105. Such is similarly the case with respect to output conduits 104 and 106 from delay valves 112 and 111 respectively, as is indicated by the respective letters A, B and C being interconnected through the bores of each of the three delay valves 110, 111 and 112 to the system pressure $P_1$. Pressure $P_1$ in conduits 104, 105 and 106, prior to translation of the delay valves, drives lockout valves 120, 121 and 122 to the position shown.

A conduit 117 having a calibrated restriction orifice 118 therein is connected to an activation pressure which, for example, may be system pressure if such is desired. Upon application of the activation pressure to the conduit 117, a metered amount of fluid flows through the restriction orifice 118 and into the bore 114 at the left side of the spool valve 113. After a predetermined period of time a sufficient build-up of hydraeric fluid pressure occurs at the left side of the spool valve 113 in the bore 114 to overcome the force of the spring 115 at the opposite side of the spool valve 113. Under these conditions the spool valve 113 translates toward the right as viewed in FIGURE 2 and in so doing establishes communication between the conduit 107 and system return $R_1$. At the same time the communication through the bore 114 between system pressure at 116 and the output conduit 105 is blocked. The predetermined period of time required, after application of the activation pressure to the conduit 117, to cause this translation of the spool valve 113 to occur is controlled by such factors as the opening of restriction orifice 118 and the spring rate 115 along with the area of the spool valve on the left side thereof. Thus, any desired delay may be accomplished and such is usually chosen to permit system pressure to become established throughout the entire control system.

Upon detection of a signal input disparity, as will be more fully explained hereinbelow, it is very often desirable that the output signal be locked in the disparity position to preclude reactivation of the failed portion of the system in the event of momentary correction of the failure. Such is accomplished by the lockout valves 120, 121 and 122. The lockout valves are identical in structure and only the valve 120 will be described in detail.

Upon operation of the delay valve 112, system return $R_1$ is connected through conduit 123 to a bore 124 within which there is housed a pair of spool valves 125 and 126. Also housed with the bore 124 is an orifice valve 127 having an orifice 128 therein as well as an orifice 129 which in turn houses a restriction orifice 131. The restriction orifice 131 communicates with system pressure $P_1$ at 132 through a conduit 133. System pressure $P_1$ also communicates through the conduit 133 with a conduit 134 to the bore 124 between the spool valves 125 and 126. System pressure $P_2$ at 135 also is applied to the left side of the spool valve 125. Under normal operating conditions, system pressure $P_1$ is applied to a conduit 133 and the orifice 129 through the restriction orifice 131 to the conduit 104 and is applied as an output signal through the conduit 22 to the switch 23 (FIGURE 1). So long as such output pressure appears in the conduit 104 there is an indication that the system is operating properly and that there is no disparity in the input signals applied thereto. However, in the event that a disparity does occur system return is connected to the conduit 104 as will be explained more fully hereinbelow, thus causing the pressure in conduit 104 to suddenly drop. Under these conditions, the pressure from system pressure $P_1$ at 132 acting against the restriction orifice 131 along with the system pressure $P_1$ and $P_2$ operating against the left side of spool valves 125 and 126 causes the orifices valve 127 to translate toward the right against the pressure of the spring 130. Such translation toward the right causes the orifice 128 in the orifice valve 127 to communicate directly with return through the conduit 136 which communicates with the conduit 123. Under these conditions, the conduit 104 and thus the output conduit 22 is locked to return irrespective of what might occur at some subsequent time in the comparator section of the system. Such operation of orifice valve 127 would also occur in the event system pressure $P_1$ were lost.

Referring now to the operation of the comparator sections 40, 60 and 80, as above described, in operation of the apparatus for comparing the hydraeric pressures, it should be noted that the system requires translation of two of the spool valves before an output signal conduit can be connected to return. In order for such to become more fully obvious, it will be assumed that the input signal at conduit 17 is of a pressure which is higher than the input signals applied to conduits 19 and 21, all spring rates are equal and all end areas of the spool valves are equal. Under these circumstances, the pressure appearing at the left side in chamber 47 of the spool valve in the compartor section 40 is greater than that appearing in chamber 48. Therefore, the spool valve translates toward the right as viewed in FIGURE 2. Such translation toward the right as viewed in FIGURE 2 establishes communication between the port 53 and 52 and the ports 55 and 54. It should be noted that ports 52 and 54 are connected to conduits 103 and 101 which are in turn connected to comparator sections 80 and 60 respectively. However, at this point, in the description the spool valves in comparator sections 60 and 80 have not translated. Under these conditions there is no communication of the output conduits 104 and 105 with system return.

However, it was assumed that the pressure appearing at the conduit 17 is higher than that appearing in 19 and 21. Therefore, the pressure appearing in the chamber 88 of comparator section 80 is higher than that appearing in the chamber 87. Under these conditions, the spool valve in comparator section 80 translates towards the left as viewed in FIGURE 2. Such translation causes ports 94 and 95 to communicate and also ports 92 and 93 to communicate. It will therefore be seen that system return is applied through a delay valve 112, conduit 109, ports 95 and 94, the conduit 103, ports 52 and 53, to the conduit 104. The system return now being connected to the conduit 104 causes actuation of the lockout valve 120 as above described, thus locking the conduit 104 to system return. Presence of system return in conduit 22 is reflected to switch 23 causing it to actuate thereby deactivating the first servo valve 11 (FIG. 1).

It should be noted that although system return is now connected also through delay valve 111, ports 93 and 92 of the comparison section 80, and conduit 102 to the ports 74 no action has occurred in conduit 106. Such is the case because the spool valve at comparison section 60 has not translated since the pressures appearing in chambers 67 and 68 associated therewith are substantially equal. Similar operation occurs with respect to a disparity in the remaining pressures. For example, assuming that the pressure in conduit 19 were excessive, the spool valves in the comparator sections 40 and 60 would translate connecting system return through a delay valve 110 to the conduit 105, thus activating the lockout valve 121. Similarly, in the event of a disparity on the pressure appearing in conduit 21 from monitor 16, a spool valve appearing in comparator sections 60 and 80 would translate connecting system return through delay valve 111 to output conduit 106, thus causing lockout valve 122 to actuate.

There has thus been disclosed an apparatus for comparing hydraeric pressures and detecting disparity therebetween which is exceedingly simple, rugged, inexpensive to manufacture and operates even under adverse conditions. It should be understood that although the apparatus in accordance with the present invention has been illustrated in some detail, such has been by way of example and is not intended to be taken as a limitation upon the scope of the claims appended hereto.

What is claimed is:

1. Apparatus for comparing first, second and third hydraeric pressures and detecting disparity therebetween comprising:
   first, second and third spool valves slidably disposed in respective bores therefor and defining a chamber at each end area of said spool valves;
   means for applying said hydraeric pressure signals to opposite end areas of said spool valves, a different pressure signal being applied to opposite ends of each valve;
   said valves each being adapted to translate within its respective bore in response to a force differential there-across;
   port means defined by each of said bores;
   passageway means communicating between said port means and adapted to interconnect predetermined ones of said port means only in response to translation of two of said spool valves.

2. Apparatus as defined in claim 1 wherein the end areas of each of said spool valves is substantially equal.

3. Apparatus as defined in claim 1 where said first pressure is applied to one end area of said first and third spool valves, said second pressure is applied to one end area of said second spool valve and the opposite end area of said first spool valve, and said third pressure is applied to the opposite end areas of said second and third spool valves.

4. Apparatus as defined in claim 3 which further includes a first output passageway means communicating with said first spool valve, said output passageway being interconnected with said predetermined port means only upon translation of said first and third spool valves.

5. Apparatus as defined in claim 4 which further includes a second output passageway means communicating with said first spool valve, said second output passageway being interconnected with said predetermined port means only upon translation of said first and second spool valves.

6. Apparatus as defined in claim 5 which further includes a third output passageway means communicating with said second spool valve, said third passageway being interconnected with said predetermined port means only upon translation of said second and third spool valves.

7. Apparatus as defined in claim 6 which further includes a return passageway means connected between the hydraeric return and said port means associated with said second and third spool valves and adapted for connecting said first, second and third output passageway means to said return only upon translation of said first and third, said first and second, and said second and third spool valves, respectively.

8. Apparatus as defined in claim 7 which further includes locking valve means connected to each of said output passageway means and adapted to lock said output passageway means to said return when said output passageway means is connected to said return by translation of said spool valves.

9. Apparatus as defined in claim 7 which further includes delay valve means connected between said return and said port means and adapted to connect said return to said port means only after a predetermined lapse of time subsequent to application of hydraeric fluid to said apparatus.

10. Apparatus as defined in claim 9 which further includes communication passageway means including said delay valve means connecting said output passageway means to a source of hydraeric fluid, said delay valve means being operative to close said communication passageway means upon the lapse of said predetermined time.

11. Apparatus for comparing at least three individual hydraeric pressure signals and detecting disparity therebetween comprising:
  a plurality of force differential responsive devices each defining at least two ports;
  hydraeric pressure transmitting means connected to each of said devices to apply two of said at least three (a) hydraeric pressure signals thereto;
  passageway means selectively interconnecting said ports, communication between preselected ones of said ports being established only upon the actuation of at least two of said devices in response to the presence of a force differential created by a disparity between said two hydraeric pressure signals applied to said actuated devices, one of said hydraeric pressure signals applied to each of said actuated devices being the same signal.

12. Apparatus as defined in claim 11 wherein said devices are spool valves slidably disposed in cylinders defining pressure chambers at each end of said spool valves and a different hydraeric pressure signal is applied to each end of a spool valve.

13. Apparatus as defined in claim 12 wherein said passageway means is connected to a source of system pressure on one side of one spool valve and to return for said source of system pressure on one side of another spool valve, said source and said return being interconnected through said passageway means upon translation of said one and said another spool valves.

References Cited
UNITED STATES PATENTS

| | | | |
|---|---|---|---|
| 2,751,933 | 6/1956 | Urteaga | 137—595 |
| 3,150,568 | 9/1964 | Junck et al. | 91—447 |
| 3,190,185 | 6/1965 | Rasmussen | 91—363 |
| 3,338,138 | 8/1967 | Wood | 91—363 |

FOREIGN PATENTS 918,144    7/1960    Great Britain.

WILLIAM F. O'DEA, *Primary Examiner.*

WILLIAM H. WRIGHT, *Assistant Examiner.*